US012051342B2

(12) United States Patent
Chen et al.

(10) Patent No.: US 12,051,342 B2
(45) **Date of Patent: *Jul. 30, 2024**

(54) 3D POP-UP CARD WITH PLUSH FIGURE

(71) Applicants: 100 Greetings, LLC, Clearwater, FL (US); JAST Company Limited, Kowloon (HK)

(72) Inventors: Jen-Lin Chen, Cupertino, CA (US); Anthony Carl Tomboc Gonzales, Parañaque (PH); Jay Kamhi, Belleair, FL (US)

(73) Assignees: 100 Greetings, LLC, Clearwater, FL (US); JAST Company Limited, Kowloon (HK)

(*) Notice: Subject to any disclaimer, the term of this patent is extended or adjusted under 35 U.S.C. 154(b) by 0 days.

This patent is subject to a terminal disclaimer.

(21) Appl. No.: 17/891,214

(22) Filed: Aug. 19, 2022

(65) Prior Publication Data

US 2023/0053542 A1 Feb. 23, 2023

(30) Foreign Application Priority Data

Aug. 20, 2021 (DE) .................... 20 2021 104 469.1

(51) Int. Cl.

| | |
|---|---|
| ***G09F 1/06*** | (2006.01) |
| ***B42D 15/02*** | (2006.01) |
| ***B42D 15/04*** | (2006.01) |
| ***G09F 13/00*** | (2006.01) |
| ***G09F 25/00*** | (2006.01) |

(52) U.S. Cl.
CPC .............. *G09F 1/06* (2013.01); *G09F 13/005* (2013.01); *G09F 25/00* (2013.01)

(58) Field of Classification Search
CPC .. B42D 15/045; B42D 15/022; B42D 15/042; B42D 15/027; B42D 15/047; G09F 1/04; G09F 1/06; G09F 1/08
See application file for complete search history.

(56) References Cited

U.S. PATENT DOCUMENTS

| | | | | | |
|---|---|---|---|---|---|
| 2,974,434 | A * | 3/1961 | Dora | B42D 15/04 | 428/116 |
| 3,228,138 | A * | 1/1966 | Lohnes | B42D 15/04 | D19/7 |
| 3,995,388 | A * | 12/1976 | Penick | G09F 1/06 | 446/148 |
| 4,349,973 | A * | 9/1982 | Penick | G09F 1/06 | 446/148 |
| 5,658,620 | A * | 8/1997 | Ross | G09F 1/08 | 40/539 |

(Continued)

*Primary Examiner* — Shin H Kim

(57) ABSTRACT

The invention relates to a 3D pop-up card comprising a plush FIG. (3) reversibly convertible from a flat compressed state to a three-dimensional expanded state, and a foldable base (5) reversibly convertible from a flat compressed state to a three-dimensional expanded state, and a foldable card (2) having an inner side and an outer side, which is reversibly transferable from a folded closed state to an unfolded opened state, wherein the foldable base (5) is fixed to the inner side of the foldable card (2) and wherein the plush FIG. (3) is fixed to the foldable base (5), and wherein the card (2) comprises an additional support element (6) which is arranged inside the base (5) and supports the base (5) from the inside in the unfolded state of the card (2).

8 Claims, 4 Drawing Sheets

(56) References Cited

U.S. PATENT DOCUMENTS

| | | | | |
|---|---|---|---|---|
| 6,199,308 | B1 * | 3/2001 | Westendorp | B42D 15/042 40/539 |
| 8,544,757 | B2 * | 10/2013 | Stahl | G06Q 30/00 235/487 |
| 11,577,539 | B1 * | 2/2023 | Chen | B42D 15/022 |
| 2008/0016732 | A1 * | 1/2008 | Gardi | B42D 1/003 40/124.08 |
| 2009/0025263 | A1 * | 1/2009 | Ross | B42D 15/042 493/381 |
| 2012/0266504 | A1 * | 10/2012 | Michlin | B42D 15/042 40/124.08 |
| 2013/0139420 | A1 * | 6/2013 | Rubar | G09F 1/06 493/54 |
| 2013/0155715 | A1 * | 6/2013 | Kim | F21L 4/00 362/184 |
| 2013/0255115 | A1 | 10/2013 | Hughes et al. | |
| 2013/0269225 | A1 * | 10/2013 | Nelson | G06F 1/00 40/124.03 |
| 2017/0087481 | A1 * | 3/2017 | Simmons | A63H 33/38 |
| 2018/0244097 | A1 * | 8/2018 | Bassett | B42D 15/045 |
| 2023/0053542 | A1 * | 2/2023 | Chen | G09F 1/06 |
| 2023/0068387 | A1 * | 3/2023 | Chen | B42D 15/045 |
| 2023/0166553 | A1 * | 6/2023 | Chen | B42D 15/022 40/124.02 |

* cited by examiner

3D POP-UP CARD WITH PLUSH FIGURE

RELATED APPLICATION

This application claims the benefit of priority of Germany Patent Application No. 20 2021 104 469.1 filed on Aug. 20, 2021, the contents of which are incorporated by reference as if fully set forth herein in their entirety.

FIELD AND BACKGROUND OF THE INVENTION

The invention relates to a 3D pop-up card with a plush figure.

3D pop-up cards, which shall hereinafter be referred to simply as 3D cards, have been known for some time in a wide variety of embodiments and essentially comprise a generally simply folded card as a base, hereinafter referred to as a card, and a figure arranged in this card. The essential function of such a 3D card is that an initially essentially two-dimensional compressed figure rises three-dimensionally from the card plane when the folded card is opened.

Preferably, respective 3D cards can be opened from a closed state by unfolding the two foldable card parts by a total of 180 degrees into a planar plane.

The underlying mechanism is based on the fact that the compressed figure is fixed in the card in such a way that by opening the folded card a tensile stress is applied to the figure, which transfers the figure from the compressed to the three-dimensional or expanded shape.

Despite increasing digitization, corresponding 3D cards are still very popular. The demand for new shapes and designs is unbroken.

At the same time, in view of the digital greeting card offers that are often available free of charge, there is enormous cost pressure on the providers of corresponding 3D cards.

A new idea is to make the three-dimensional figure out of fabric. The construction of such a 3D card with a plush figure thus requires, on the one hand, the formation of this very plush figure, which can be transformed from a compressed two-dimensional into a three-dimensional state, and, on the other hand, a means of attaching this figure inside the card.

However, unlike the three-dimensional figures made of paper or similar stiff materials known from other 3D cards, the plush figure will not take on a stable three-dimensional shape by itself when the card is unfolded, but will at least partially collapse.

Thus, up to now, no satisfactory, namely a stable and at the same time cost-effective and space-saving construction is known to expandably attach a plush figure in a 3D card.

SUMMARY OF THE INVENTION

It is therefore the task of the invention to provide a construction that enables the attachment of plush figures in a 3D card.

This task is solved by an invention having the features of claim 1. Advantageous embodiments are respectively the subject of the dependent claims. It should be noted that the features listed individually in the claims can also be combined with one another in any desired and technologically useful manner, thus showing further embodiments of the invention.

The 3D pop-up card according to the invention comprises a plush figure reversibly transferable from a flat compressed state to a three-dimensional expanded state, and a foldable base reversibly transferable from a flat compressed state to a three-dimensional expanded state, and a foldable card having an inner side and an outer side, reversibly convertible from a folded closed state to an unfolded opened state, wherein the foldable base is secured to the inside of the foldable card, and wherein the foldable figure is secured to the foldable base, and the card comprises an additional support element disposed inside the base and supporting the base from the inside in the unfolded state of the card.

The plush figure may be made of any material. The term plush is to be understood broadly here and includes any woven, knitted, crocheted or other textile. Of course, non-textile decorations can also be provided on the plush figure, for example decorations made of metal, plastic or glass. The possibilities of corresponding decorations are not to be enumerated exhaustively here and are ultimately not relevant to the invention.

An essential idea of the invention lies in the attachment of a base with an additional support element, wherein the support element is provided within the base along the centre line of the foldable card and wherein the foldable plush figure can be attached to the base.

The problem with using a plush figure as a 3D figure in a folding card is namely the complete and uniform unfolding of the folded plush figure when the card is opened, since a plush figure alone, due to its usually rather soft and unstable textile material, does not have sufficient rigidity to independently maintain its three-dimensional shape in the unfolded state.

The base with support element solves this problem. The expansion of the fabric figure is directly triggered by the expansion of the base.

The 3D card according to the invention thus comprises three foldable elements, namely the actual three-dimensional fabric figure, the base with support element and the foldable map.

The foldable elements can each be reversibly transformed from a folded or compressed state into an unfolded or expanded state. The transformation is triggered by opening or closing the foldable card.

The card (or the 3D card or 3D pop-up card) is considered to be opened when the unfolded card forms a plane, i.e. the two parts or halves of the card have been unfolded by an angle of 180° and lie next to each other in one plane. On the other hand, the card should be considered closed when the two parts or halves of the card lie on top of each other and their inner sides lie on top of each other.

The 3D card thus has an outer side and an inner side, the base being fixed to the inner side and the base and the plush figure being located between the inner sides of the folded card when the card is closed.

Preferably, the card is provided in at least two layers with an outer layer and an inner layer. Such a double-layer design of the card is advantageous in order to be able to arrange the electronics, which will be described in more detail below, in a sandwich-like manner between the two layers and thus conceal them.

Preferably, such a double-layered card is obtainable by folding a card originally provided with four sections lying side by side. Accordingly, such a raw card comprises four sections, namely two outer sections and two inner sections. This raw card is preferably provided in one piece with an outer side and an inner side, but variants are also conceivable in which the raw card is composed of several pieces.

For example, individual sections, several sections or all sections can be secondarily connected to each other, for example by adhesive joints.

Preferably, the two outer sections and the two inner sections correspond to each other in their outlines, with the outer section being folded over onto the adjacent inner section in each case.

Accordingly, a double-layered card is obtained whose visible surfaces correspond to the outside of the raw card, whereas the inside of the raw card lies between the folded sections.

Accordingly, it is sufficient to print only on the outside of the raw card in order to obtain a double-layered card printed on all visible surfaces after the sections have been folded over.

The sections of the card may include recesses and inserts to define and place other elements, such as the base, support element or other light and sound effects in or on the card.

The base preferably has substantially the basic shape of the plush figure. Thus, if the plush figure is provided in a conical shape, the base is also provided in a conical shape. If the fabric figure is cylindrical, the base is also cylindrical, etc.

The base can preferably be fixed by means of fixing elements, for example tabs, in the slots provided for this purpose in the card. Alternatively, the base can also be attached directly to the inside of the card, for example by gluing the fixing elements to the inside of the card.

The plush figure can be fixed to the base preferably by known adhesive means. When the card is closed, both the three-dimensional fabric figure and the base are transformed into an essentially flat, two-dimensional shape.

In order to be able to reduce the material of the base as much as possible and still create sufficient stability, it is sufficient in the construction according to the invention with a base and additional support element to manufacture the base from a rather thin but sufficiently rigid material and only the support element from a comparatively more stable material. For example, the base can be made of a flexible film or paper, but the support element should be made of a stronger plastic, for example PET, or cardboard, and should not bend so easily.

The support element is substantially flat and may be provided in one piece. In its outline, it corresponds substantially to the axial longitudinal section through the expanded base. Thus, for a base in the shape of an acute cone, the shape of the support element would be an isosceles triangle, for an obtuse cone it would be a trapezoid, for a cube it would be a square, and so on.

Preferably, the support element itself is provided in at least two parts and comprises a reinforcing element in addition to the actual support element described above. The reinforcing element is connected to the support element.

In such a two-part construction, the material of the actual support element can also be rather thin and be provided, for example, of paper, since the overall construction of support element and reinforcing element is given the required strength primarily by the reinforcing element. The shape of the reinforcing element follows the shape of the support element.

Preferably, the support element comprises fixing elements on the lower side to be connected to the card, which allow a more stable connection between the support element and the card. Preferably, the support element is fixed to the card alone.

Various recesses can be provided for fixing or also passing through further elements on the support element, for example light elements or a corresponding cabling.

In particular on the reinforcing element but also on the support element per se, projections may be provided which project beyond the actual outline of the support element as described above and which, in particular, may project out of the base and correspondingly out of the plush figure when the card is unfolded. The extension or elements fixed thereto thus protrude from the fabric figure when the card is opened.

For example, the plush figure may represent a cake from which a candle protrudes only when the card is opened. The candle is accordingly fixed to an extension of the reinforcing element or the support element. Many other combinations of plush figures and other gimmicks on the corresponding extensions are conceivable.

Preferably, the card comprises, in addition to the plush figure, further light effects and acoustic effects which are triggered by opening the card.

For this purpose, the card comprises usual electronic elements such as a power supply, a switch, an integrated circuit for controlling the electronic elements and a number of light elements and acoustic elements. Preferably, the electronic elements, with the exception of the light and acoustic elements, are arranged on a printed circuit board.

Preferred light elements are LEDs, whereby colours and number of LEDs can be arbitrary. Preferred acoustic elements are loudspeakers. The light and acoustic elements are intended to output certain visual and acoustic stimuli. A preferred power supply is batteries or rechargeable batteries.

The switch is used to activate the electronics when the 3D card is opened, in order to add visual and acoustic stimuli to the opening and/or the opened state of the 3D card with the unfolded figure. Accordingly, all types of switches as well as light or motion sensors are suitable which enable activation of the electronics by opening the card. The skilled person is familiar with corresponding switches and sensors.

The 3D pop-up card according to the invention has the advantage that the fabric figure is significantly more dimensionally stable when erected due to the base and the reinforcing element. The construction of the base according to the invention with an additional reinforcing element also enables an extremely material-saving and yet stable design.

BRIEF DESCRIPTION OF THE SEVERAL VIEWS OF THE DRAWINGS

The invention and the technical environment are explained in more detail below with reference to the figures. It should be noted that the figures show a particularly preferred embodiment of the invention. However, the invention is not limited to the embodiment variant shown. In particular, the invention encompasses, to the extent that it is technically useful, any combination of the technical features listed in the claims or described in the description as relevant to the invention.

Showing.

DESCRIPTION OF SPECIFIC EMBODIMENTS OF THE INVENTION

Figure 1:
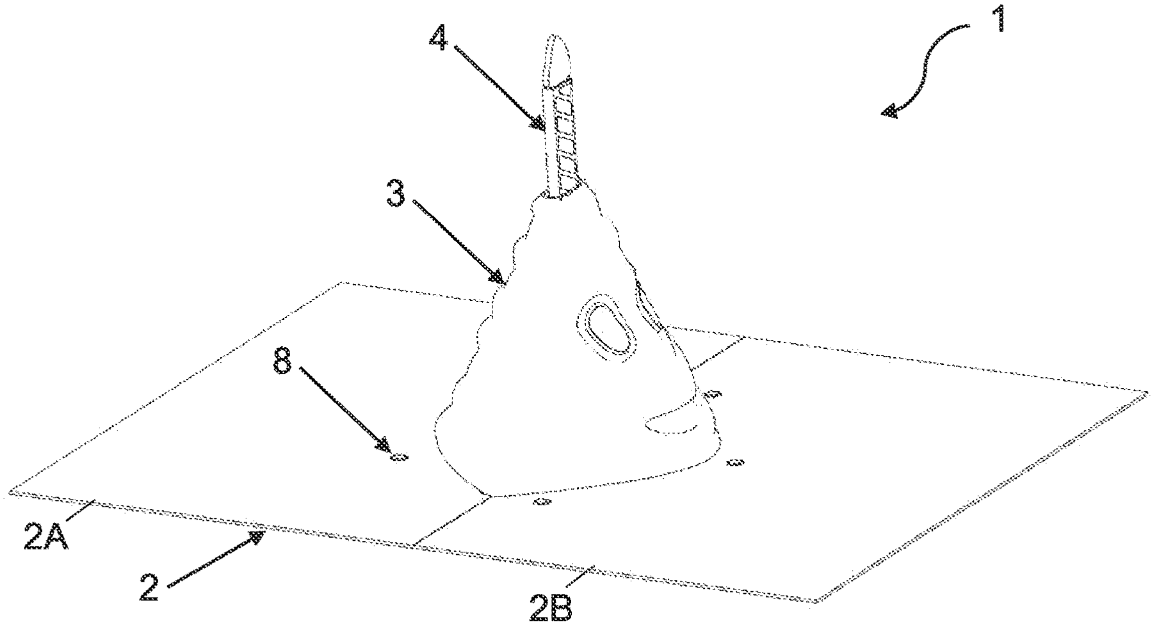
FIG. 1 a preferred embodiment of the 3D map with plush figure.
Figure 3:
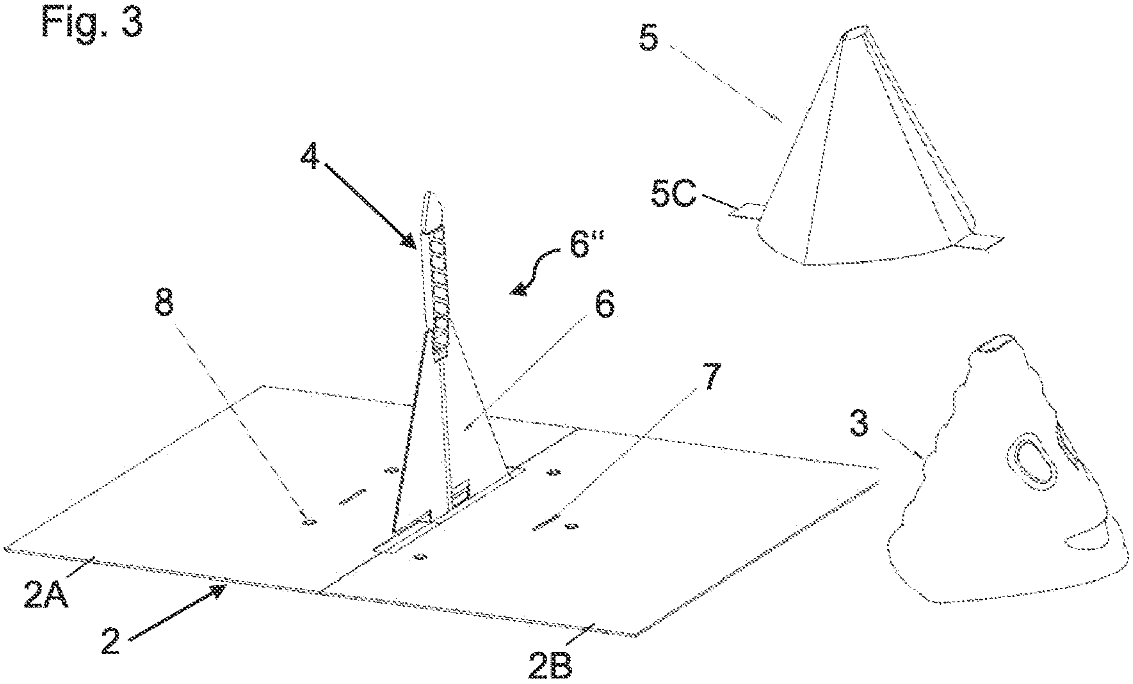
FIG. 3 the individual elements of the preferred embodiment of the 3D card.

FIG. 1 shows a preferred embodiment of the 3D card 1 with plush FIG. 3. The plush FIG. 3 is arranged together with a lighting element 4 on the inner surface formed by the two halves 2A, 2B of the foldable card 2. In the illustrated unfolded state, the two halves 2A, 2B of the foldable card 2 form a planar plane from which the plush FIG. 3 with a lighting element 4 protrudes. A number of first recesses 8 are provided on the inner surface to enable further lighting effects by means of lighting elements (LEDs) which can be attached there.

Figure 2:
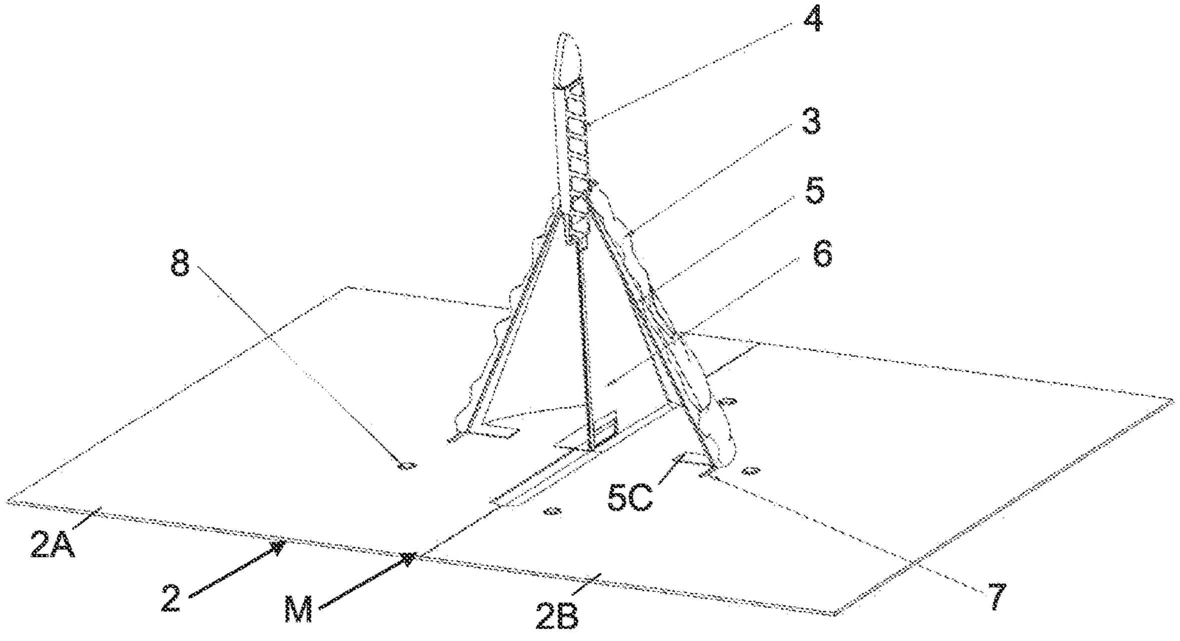
FIG. 2 the preferred embodiment of the 3D card with a longitudinal section through the plush figure, the base and the support element.

FIG. 2 shows the preferred embodiment of the 3D card 1 according to FIG. 1, whereby a longitudinal section through the plush FIG. 3 is shown. In the longitudinal section, the inner construction within the plush FIG. 3 can be seen. This internal construction comprises a cone-shaped base 5 and an additional support element 6.

The cone-shaped base 5 comprises second fixing means 5C, by which the base 5 is fixable to the inner side of the card 2 and preferably to inserts 7 provided therefor.

The additional support element 6 is provided inside the conical base 5. The shape of the support element 6 corresponds essentially to the sectional surface of a longitudinal section through the blunt conical base 5, i.e. it is trapezoidal.

The additional support element 6 is provided along the centre line M of the card 2.

FIG. 3 shows individual elements of which the 3D card 1 (FIG. 1) is composed, namely the card 2 with the two halves 2A, 2B and the support element 6 arranged between the two halves 2A, 2B with the lighting element 4 as well as the base 5 with the two second fixing means 5C and the plush FIG. 3.

The combination of support element 6, reinforcing element 10 (FIG. 6) and lighting element 4 forms the reinforced illuminated support element 6".

The support element 6 or the reinforced illuminated support element 6" is provided centrally on the inside of the card 2 between the two halves 2A, 2B. In the unfolded state of the card 2 it protrudes vertically from the card 2, in the folded state of the card 2 (not shown) it lies flat between the two halves 2A, 2B of the card 2.

The expanded shape of the base 5 preferably follows the shape of the expanded plush FIG. 3 in order to fulfil as good a support function as possible, i.e. to hold the fabric FIG. 3 in its intended expanded shape.

The base 5 is slid over the support element 6 with the lighting element 4 to mount the 3D card and is fixed to the inside of the card 2 with the second fixing means 5C on inserts 7 provided for this purpose.

The fabric FIG. 3 is then slid over the base 5 and fixed to it, for example glued to it.

Figure 4:
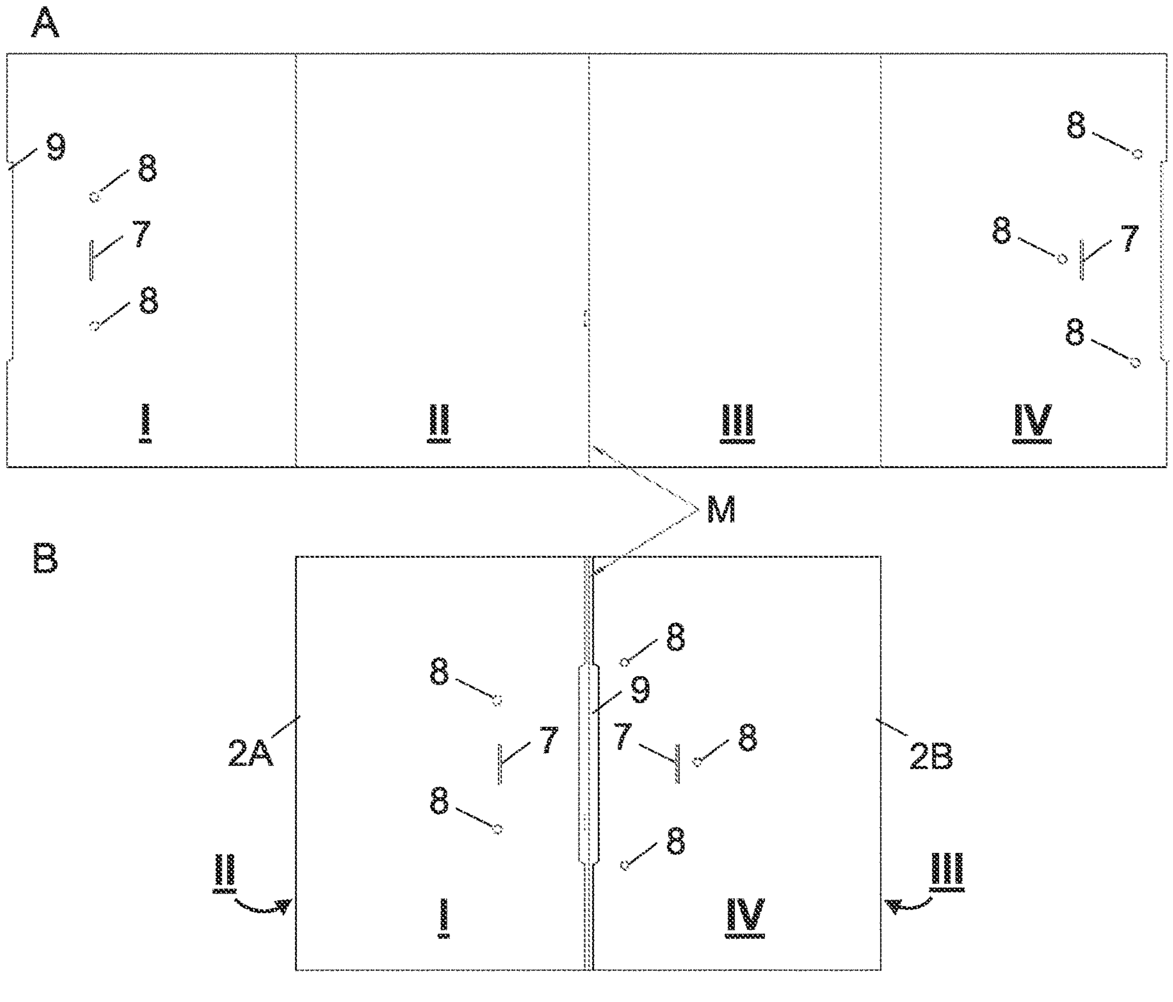
FIG. 4 a preferred embodiment of the card.

FIG. 4 shows a preferred and inexpensively producible embodiment of the foldable card 2. As FIG. 4A shows, the card 2 is manufactured in one piece and in its unmounted form comprises four sections I to IV arranged next to each other, sections I and IV as well as II and III each corresponding in size. Sections I and IV are provided slightly narrower than sections II and III. In addition, sections I and IV each include a second recess 9 on their outer edge.

As FIG. 4B shows, the card 2 is assembled by folding section I over section II and section IV over section III. Accordingly, the outer edges with the second recesses 9 of sections I and IV are opposite each other at the card centre line M with a small gap. During further assembly, the support element 6 or ultimately the reinforced support element with the light element 6" is fixed in this gap or the second recesses 9.

Figure 5:
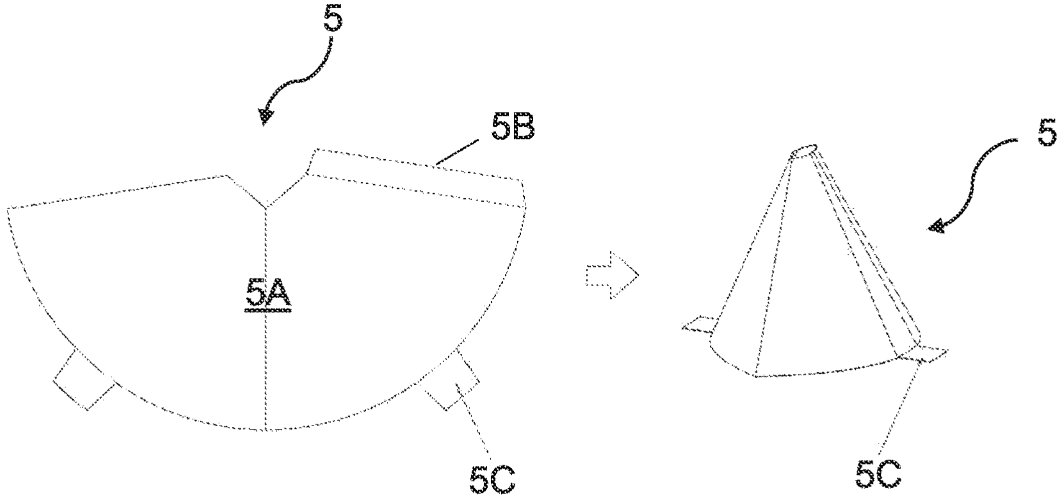
FIG. 5 a preferred embodiment of the base.

FIG. 5 shows the details of the base 5 with the base body 5A, the first fixing element 5B and the second fixing elements 5C once in the non-assembled and in the assembled state. The base 5 in this case is—according to the plush figure—conical in shape with an open upper end for the lighting element 4 to pass through (FIG. 3).

Figure 6:
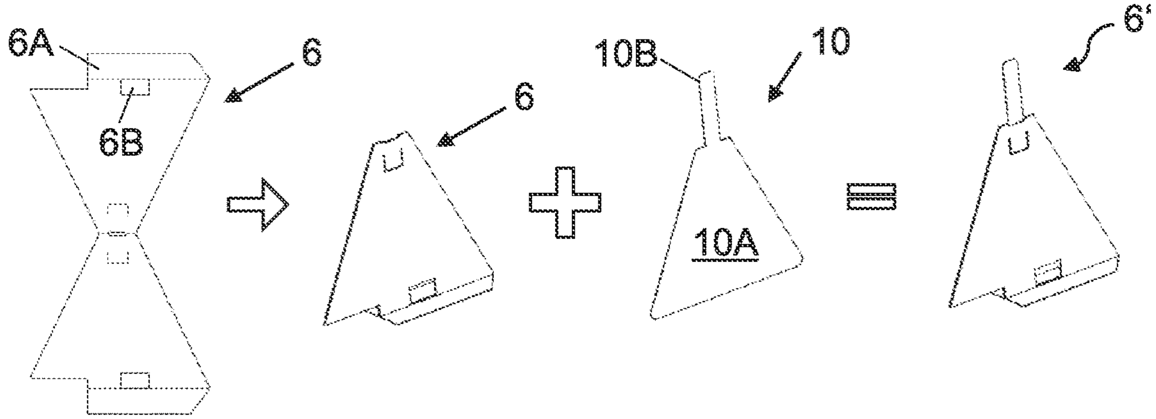
FIG. 6 a preferred embodiment of the support element and the reinforcing element.

FIG. 6 shows the details of the support element 6 with the fixing elements 6A and the recess 6B as well as the reinforcing element 10 with the reinforcing body 10A and the extension 10B once in the non-assembled and in the assembled state. The support element 6 is trapezoidal in shape, corresponding to the shape of the base 5 (FIG. 5).

The fixing elements 6A are provided for fixing the support element 6 to the card 2 (FIG. 2). The recesses 6B are provided for the optional passage of connections of a light element (not shown).

The support element 6 preferably comprises two congruent elements which can be folded onto each other, whereby the optional reinforcing element 10 can be provided between the two elements. In this case, the outline of the body 10A of the reinforcing element 10 substantially corresponds to the outline of the support element 6.

The reinforcing element 10 may—as shown—comprise an extension 10B which is provided for the attachment of, for example, a lighting element 4 (FIG. 1). The combination of support element 6 and reinforcing element 10 is a reinforced support element 6'.

Figure 7:
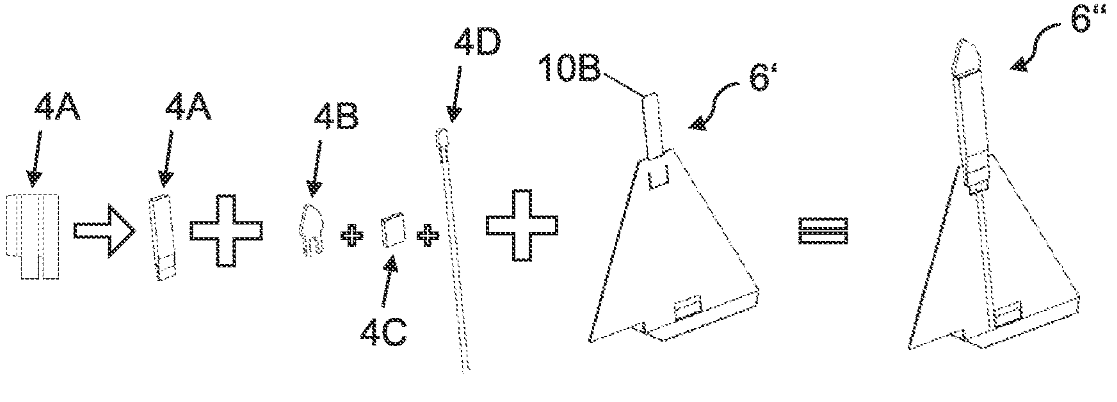
FIG. 7 a preferred embodiment of the support element with reinforcing element and light element.

FIG. 7 shows the details of the lighting element 4 and the final construction of the reinforced illuminated support element 6" comprising the lighting element 4 and the reinforced support element 6'. The lighting element 4 can be constructed, as shown in the example of a candle, from the lighting element body 4A, an effect element 4B—which in the present case imitates a flame by its shape, a shielding element 4C and an illuminant (LED) 4D. The shielding element 4C is provided so that the light of the LED 4D can be perceived only through the effect element 4B.

The lighting element 4 is preferably fixed to the extension 10B of the reinforcing element 10.

Figure 8:
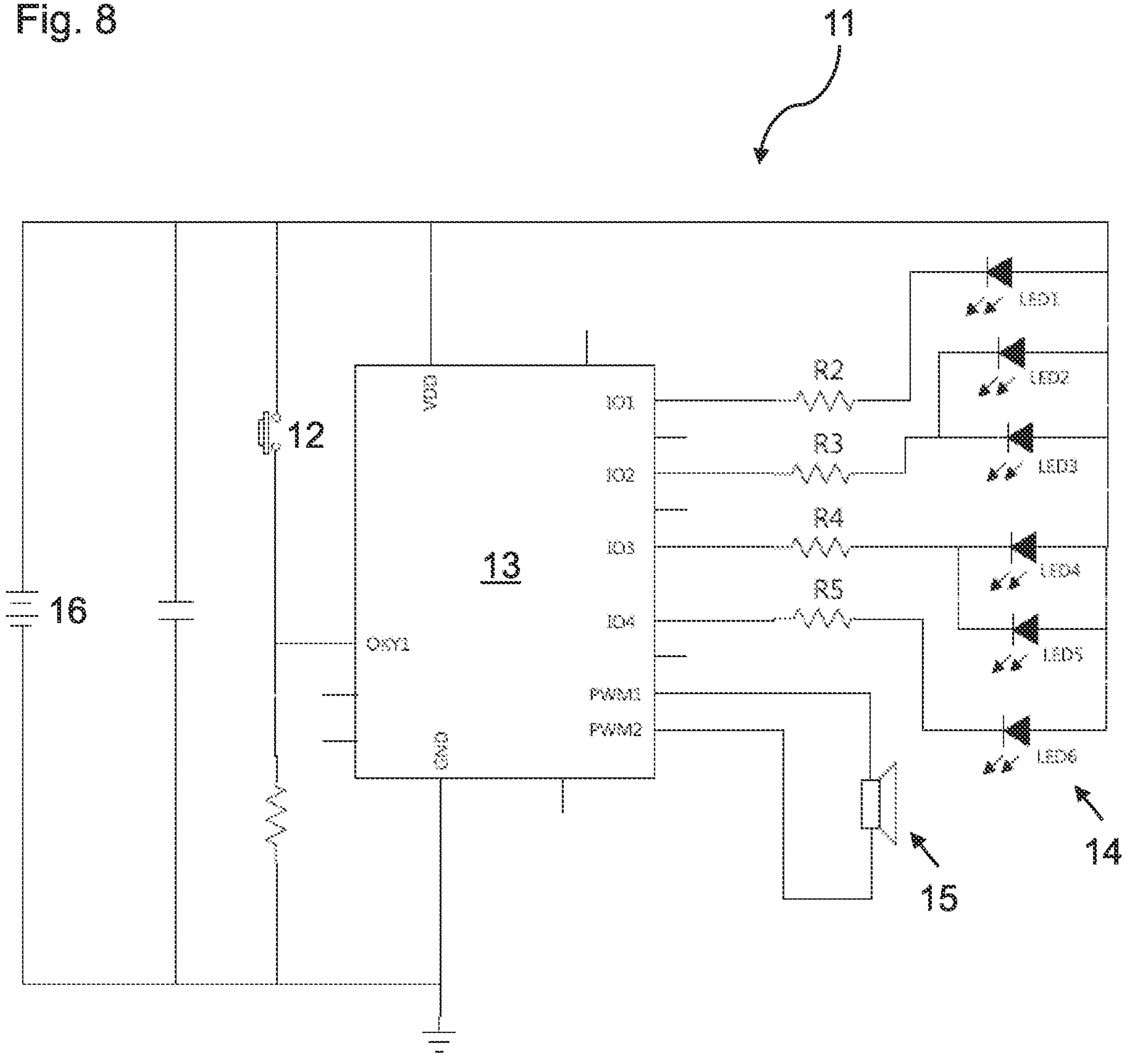
FIG. 8 a preferred embodiment of the electronic circuit.

FIG. 8 shows a preferred circuit diagram 11 for the electronics of the 3D card 1 according to the invention (FIG. 1) with a power supply 16, a switch 12, an integrated circuit or also a microprocessor 13 as well as a number of light elements 14 and acoustic elements 15. Preferably, all the elements mentioned, with the exception of the light and possibly the acoustic elements 14, 15, are arranged on a printed circuit board.

Preferred light elements 14 are LEDs, whereby the colours and number of LEDs can be arbitrary. Preferred acoustic elements 15 are loudspeakers. The light and acoustic elements 14, 15 are provided to output certain visual and acoustic stimuli. A preferred power supply 16 is batteries or rechargeable batteries.

The switch 12 is used to activate the electronics when the 3D card is opened, in order to add visual and acoustic stimuli to the opening and the opened state of the 3D card with the unfolded figure. Accordingly, all types of switches are suitable which enable activation of the electronics by opening the card. Corresponding switches are known to the skilled person.

REFERENCES

1 3D pop-up card
2 Foldable card (2A: first half; 2B: second half)
3 Plush figure (three-dimensional)
4 Lighting element (4A: lighting element body; 4B: effect element; 4C: shielding element; 4D: illuminant, LED)
5 Base (5A: base body; 5B: first fixing element; 5C: second fixing element)
6 Support element (6A: fixing element; 6B: recess; 6': reinforced support element; 6": reinforced illuminated support element)
7 Insertion
8 First recess
9 Second recess
10 Reinforcing element (10A: body; 10B: extension)
11 Circuit
12 Switch
13 Microprocessor (IC)
14 Light source (LED)
15 Acoustic element (loudspeaker)
16 Power supply
M Centre line
I-IV Sections of the card

What is claimed is:

1. A three dimensional (3D) pop-up card comprising: a plush figure reversibly convertible from a flat compressed state to a three-dimensional expanded state, a foldable base reversibly convertible from a flat compressed state to a three-dimensional expanded state, and a foldable card having an inner side and an outer side, which is reversibly transferable from a folded closed state to an unfolded opened state, wherein the foldable base is fixed to the inner side of the foldable card; wherein the plush figure is fixed to the foldable base; wherein the card comprises an additional support element which is arranged inside the base and supports the base from the inside in the unfolded state of the card; wherein said plush figure is a textile figure made of a textile material and has a hollow interior accessible through an open bottom: wherein said additional support element extends into said interior of said plush figure through the open bottom; wherein said plush figure is pressed against said additional support element when said foldable card is moved into said folded closed state; wherein said plush figure is made of at least one of a woven textile material, a knitted textile material, and a crocheted textile material.

2. The 3D pop-up card according to claim 1, wherein the additional support element is fixed to the card alone.

3. The 3D pop-up card according to claim 1, wherein the additional support element comprises a material which is more dimensionally stable than the material of which the base is made.

4. The 3D pop-up card according to claim 1, wherein the foldable base is conical in the expanded state and has a round outline.

5. The 3D pop-up card according to claim 1, wherein the card further comprises light and acoustic elements, a switch for activating the light and acoustic elements, a circuit or microprocessor for controlling the electrical components and a power supply.

6. The 3D pop-up card according to claim 1, wherein the card is divided into two halves which are provided foldable on top of each other and wherein the halves are provided in double layers with an inner and an outer layer.

7. The 3D pop-up card according to claim 1, wherein the support element comprises a reinforcing element.

8. The 3D pop-up card according to claim 1, wherein the reinforcing element comprises a body and an extension, said extension protruding from a fabric figure when the card is opened.

* * * * *